US010694747B2

(12) United States Patent
Swanson et al.

(10) Patent No.: US 10,694,747 B2
(45) Date of Patent: Jun. 30, 2020

(54) DISPENSER COMPRISING ONLY ONE SINGLE HINGE

(71) Applicant: S.C. Johnson & Son, Inc., Racine, WI (US)

(72) Inventors: Heather J. Swanson, Racine, WI (US); Neysa Volkert, Racine, WI (US); Joel E. Adair, Racine, WI (US); Brian T. Davis, Burlington, WI (US); Syatrizal Hamdallah, Chicago, IL (US); Maude Christian Meier, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 242 days.

(21) Appl. No.: 14/079,215

(22) Filed: Nov. 13, 2013

(65) Prior Publication Data

US 2014/0141051 A1 May 22, 2014

Related U.S. Application Data

(60) Provisional application No. 61/729,272, filed on Nov. 21, 2012.

(51) Int. Cl.

| | |
|---|---|
| ***A01N 53/00*** | (2006.01) |
| ***A01N 65/44*** | (2009.01) |
| ***A01N 65/00*** | (2009.01) |
| ***A01M 1/20*** | (2006.01) |

(52) U.S. Cl.
CPC ........... *A01N 53/00* (2013.01); *A01M 1/2055* (2013.01); *A01N 65/00* (2013.01); *A01N 65/44* (2013.01)

(58) Field of Classification Search
CPC ........ A01N 53/00; A01N 65/44; A01N 65/00; A01M 1/2055
See application file for complete search history.

(56) References Cited

U.S. PATENT DOCUMENTS

| | | | |
|---|---|---|---|
| 3,116,077 | A | 12/1963 | Bird |
| 3,120,345 | A | 2/1964 | Bolger |
| 3,655,129 | A | 4/1972 | Seiner |
| 4,228,614 | A | 10/1980 | Cardarelli |
| 4,283,011 | A | 8/1981 | Spector |
| 4,419,396 | A | 12/1983 | Sugimoto |
| 4,484,768 | A | 11/1984 | Norfleet |
| 4,663,315 | A | 5/1987 | Hasegawa et al. |

(Continued)

FOREIGN PATENT DOCUMENTS

| | | |
|---|---|---|
| CN | 101116439 | 2/2008 |
| CN | 102745635 | 10/2012 |

(Continued)

OTHER PUBLICATIONS

PCT/US2013/070755 International Search Report and Written Opinion dated Jul. 4, 2014.

(Continued)

*Primary Examiner* — Trevor Love
(74) *Attorney, Agent, or Firm* — Quarles & Brady LLP

(57) ABSTRACT

Dispensers for dispensing an insect control active include a porous substrate impregnated with an insect control active. The porous substrate has a minimal bending moment of about 150 to about 275 g-cm. Upon activation, the dispenser exhibits an effective release rate of the insect control active of about 0.1 to about 0.3 mg/hr.

18 Claims, 10 Drawing Sheets

(56) References Cited

U.S. PATENT DOCUMENTS 4,696,844 A 9/1987 Spector
4,802,626 A 2/1989 Forbes et al.
4,961,930 A 10/1990 Perdelwitz, Jr. et al.
5,003,635 A 4/1991 Peterson
5,062,551 A 11/1991 Goldstein et al.
5,248,537 A 9/1993 Giannavola
5,516,504 A 5/1996 Tominson
6,171,608 B1 1/2001 Schmitt et al.
6,327,813 B1 12/2001 Ishiwatari
6,360,447 B1 3/2002 Foley
6,360,477 B1 3/2002 Flashinski et al.
6,484,438 B2 11/2002 Matsunaga et al.
6,520,365 B2 2/2003 Schneider
6,534,079 B1 3/2003 Munagavalasa
6,551,560 B1 4/2003 Flashinski et al.
6,557,778 B1 5/2003 Shiffler
6,575,383 B2 6/2003 Dobler et al.
6,582,714 B1 6/2003 Emmrich et al.
6,599,525 B2 7/2003 Scamilla Aledo et al.
6,616,004 B1 9/2003 Erickson et al.
6,736,285 B2 5/2004 Stewart-Stand
6,755,453 B2 6/2004 Kellas
6,909,840 B2 6/2005 Harwig et al.
6,913,733 B2 7/2005 Hardy et al.
6,976,729 B2 12/2005 Kellas
7,017,829 B2 3/2006 Martens, III et al.
7,051,949 B2 5/2006 Aiyama
7,152,809 B2 12/2006 Ketcha et al.
7,188,780 B2 3/2007 Martens, III
7,213,770 B2 5/2007 Martens, III et al.
7,344,729 B2 3/2008 Kemmis et al.
7,398,013 B2 7/2008 He et al.
7,419,102 B2 9/2008 Harris
7,426,799 B2 9/2008 Christianson et al.
7,503,675 B2 3/2009 Demarest et al.
7,530,503 B2 5/2009 Caserta et al.
7,544,332 B2 6/2009 De Silva et al.
7,581,558 B2 9/2009 Martin et al.
7,887,759 B2 2/2011 Triplett
7,887,826 B2 2/2011 Costa
7,926,734 B2 4/2011 Dobler et al.
7,980,507 B2 7/2011 Patrick
8,047,837 B2 11/2011 Furner et al.
8,048,517 B2 11/2011 Kimball et al.
8,070,006 B2 12/2011 Austin et al.
8,091,741 B2 1/2012 Pritchard
8,093,444 B2 1/2012 Flick
8,178,114 B2 5/2012 Klausen et al.
8,312,696 B2 11/2012 Dais et al.
8,480,960 B2 7/2013 Wheatley et al.
2003/0060350 A1 3/2003 Taylor et al.
2003/0168520 A1 9/2003 Triplett et al.
2003/0199421 A1 10/2003 Copfer
2004/0228896 A1 11/2004 Harada et al.
2005/0132500 A1 6/2005 Karl et al.
2005/0196571 A1 9/2005 Penny, III et al.
2005/0284866 A1 12/2005 Oakner et al.
2007/0140924 A1 6/2007 Hill
2008/0105760 A1 5/2008 Sheffield et al.
2008/0226685 A1 * 9/2008 Balakrishnan ......... A01N 53/00
424/411
2008/0265053 A1 10/2008 Guzman
2009/0090466 A1 4/2009 Huppert et al.
2010/0055075 A1 3/2010 Marsala et al.
2010/0236709 A1 9/2010 Mutch
2011/0010817 A1 1/2011 Théberge et al.
2011/0117156 A1 5/2011 Lin et al.
2011/0198808 A1 8/2011 Fischer et al.
2011/0278370 A1 11/2011 Glydon
2011/0305644 A1 12/2011 Vijay et al.
2012/0055075 A1 3/2012 Winkler et al.
2013/0168463 A1 7/2013 Dobler et al.

FOREIGN PATENT DOCUMENTS

EP 0420144 A1 4/1991
EP 0925717 A1 6/1999
EP 1216615 A1 6/2002
EP 1182932 B1 8/2003
EP 1661458 A1 5/2006
GB 727577 4/1955
GB 2039740 A 8/1980
GB 2380940 4/2003
GB 2407770 5/2005
GB 2407771 5/2005
GB 2417902 3/2006
JP H11 164766 A 6/1999
JP 2005298362 10/2005
JP 4182512 B2 11/2008
JP 2014-058455 A 4/2014
WO WO2001045506 A1 6/2001
WO 01/72121 A2 10/2001
WO WO2002017977 A2 3/2002
WO 2002083043 A1 8/2002
WO 2003032723 A1 4/2003
WO 2004096588 A2 11/2004
WO WO2005004597 1/2005
WO 2005/044005 A1 5/2005
WO 2005044001 5/2005
WO 2005044320 A1 5/2005
WO 2005046332 5/2005
WO 2006002395 A2 1/2006
WO 2006088139 2/2006
WO 2006134353 6/2006
WO WO 2006/091670 * 8/2006 ............. A01N 25/18
WO 2007062471 A1 6/2007
WO 2008012507 1/2008
WO WO2010068479 A1 6/2010
WO WO2010086872 A1 8/2010
WO 2011030122 3/2011

OTHER PUBLICATIONS

Fire Electricity Safety Essential )Oil Baby Children Repellent Paper Mosquito Coil Killer, website, Mar. 4, 2013, 6 pages, Zhejiang China, http://www.aliexpress.com/store/product/Free-Shipping-Wholesales-50PCS-LOT-NO-Fire-Electricity-safety-Essential-oil-Baby-children-Repellent-Paper-Mosquito/610329_567352609.html.

Argueta, Kawada, and Takagi, "Spatial repellency of metofluthrin-impregnated multilayer paper strip against Aedes albopictus under outdoor conditions, Nagasaki, Japan", Jun. 28, 2004, 6 pages, vol. 55, No. 3.

* cited by examiner 10
16
36
30

10
X
22
12
16
14
36
20
18
34
32
30

10
36
12
16

28
18
10
36
12
30
26
24
16

DISPENSER COMPRISING ONLY ONE SINGLE HINGE

CROSS REFERENCE TO RELATED APPLICATIONS

This application claims priority to U.S. Provisional Application No. 61/729,272, filed Nov. 21, 2012, which is incorporated by reference.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Background

The present invention relates generally to a passive volatile material dispenser.

2. Description of the Background

Various volatile material dispensing devices are known that generally include a reservoir that holds a volatile material and may include a housing or support structure to retain the reservoir. These devices typically either allow passive diffusion of the volatile material to occur without the aid of a dispensing mechanism or enhance and/or facilitate the release of the volatile material using a dispensing mechanism. Typical dispensing mechanisms used in volatile material dispensing devices include a heating device and/or a fan. Such prior passive dispensers often require costly materials that lead to more expensive dispensers. In addition, common volatile materials incorporated into waxes and gel systems tend to be fragile. Such volatile materials are therefore susceptible to impact, extreme temperatures, and changes in humidity. There is a need, therefore, for inexpensive and durable passive dispensers that provide greater accessibility to volatile dispensers in inclement environments.

SUMMARY OF THE INVENTION

According to one aspect, a dispenser for dispensing an insect control active includes a porous substrate impregnated with an insect control active. The porous substrate has a minimal bending moment of about 150 to about 275 g-cm. Upon activation, the dispenser exhibits an effective release rate of the insect control active of about 0.1 to about 0.3 mg/hr.

According to another aspect, a method of using a passive volatile material dispenser includes identifying a confined space to be protected from a pest. The confined spaced includes a horizontally disposed top barrier, a vertically disposed perimeter barrier that extends from the top barrier to a bottom barrier, a first zone that extends vertically downward from the top barrier to a first height, and a second zone that extends vertically downward from the first height to the bottom barrier. The method further includes the steps of activating a passive volatile material dispenser including a porous substrate impregnated with an insect control active, and placing the activated passive volatile material dispenser in the first zone. Each of the top barrier and the perimeter barrier is at least partially impervious to air currents.

According to a further aspect, a method of providing a passive volatile material dispenser to consumers includes providing a sealed pouch containing a passive volatile material dispenser having instructions. The passive volatile material dispenser includes a porous substrate impregnated with an insect control active. The instructions direct a consumer to open the pouch and remove the passive volatile material dispenser therefrom to activate the passive volatile material dispenser, and to place the activated passive volatile material dispenser substantially in a center of a room.

BRIEF DESCRIPTION OF THE DRAWINGS

Other aspects and advantages of the present invention will become apparent upon reading the following detailed description and upon reference to the drawings in which.

DETAILED DESCRIPTION OF THE INVENTION

Figures 1, 2:
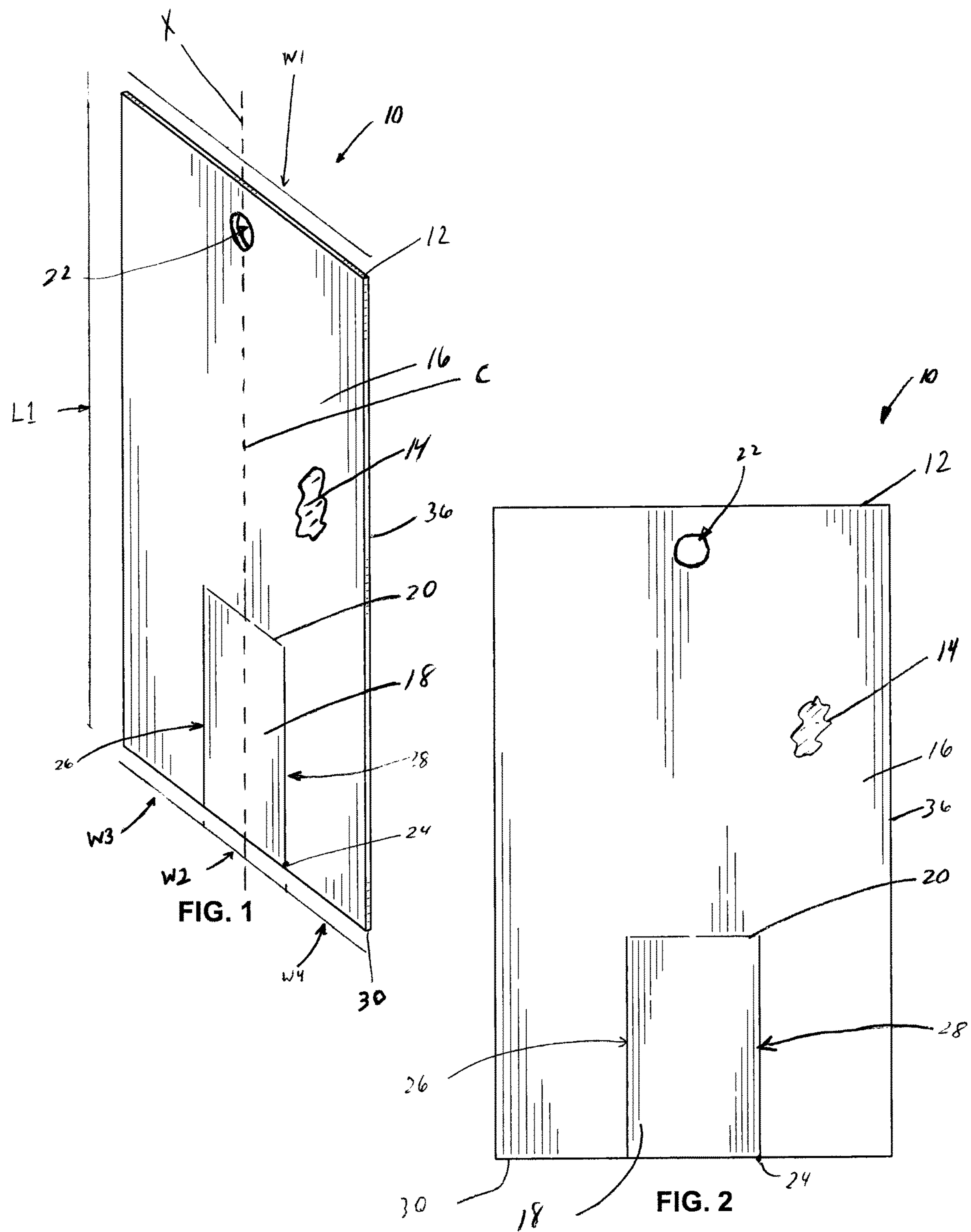
FIG. 1 is a front isometric view of a first embodiment of a dispenser in a first state.
FIG. 2 is a front elevational view of the dispenser of FIG. 1, the rear elevational view being a mirror image thereof.

As depicted in FIGS. 1 to 11, a dispensing device 10 generally includes a substrate 12 and a volatile material 14 disposed on and/or in the substrate. The dispensing device 10 is adapted to passively dispense the volatile material 14 when air flows through and/or around the substrate 12. The substrate 12 includes a first wall portion 16 and a second wall portion 18 hingedly attached to the first wall portion along a fold line 20. The substrate 12 may also include one or more apertures 22 of any shape to permit the dispenser 10 to be hung, for example, from a wall hanger display or other location when in use and/or to increase air flow through the dispenser. Additionally, a string (not shown) may be provided through the aperture 22 to assist in hanging the dispenser 10.

The substrate 12 is designed to carry the volatile material 14, whether on a surface thereof and/or absorbed therein, and release it into the ambient environment once exposed thereto. In one embodiment, the substrate 12 includes a volatile active-permeable material, such as a cellulose fiber-containing substrate. Cellulose fiber-based substrates may include an amount of cellulose by weight ranging from less than about 50% to about 99%, or about 75% to about 99%, or about 95% to about 99%, or about 97.5% to about 98.5%, or more or less. Similarly, cellulose fiber-based substrates may include an amount of a secondary material by weight ranging from about 1% to greater than about 50%, about 1% to about 25%, or about 1% to about 5%, or about 1.5% to about 2.5%, or more or less. Secondary materials include, for example, binders, pigments, polymers, resins, dyes, and other materials known in the art. In one embodiment, a cellulose fiber-based substrate may have about 98.5% cellulose and about 1.5% wet strength polyamide resin.

In one embodiment, cellulosic materials, such as those available from EMI Specialty Papers (Redding, Conn.) may be used. Specifically, one particular embodiment utilizes Grade 30250 paperboard from EMI Specialty Papers. Another embodiment utilizes Grade 18430 from EMI Specialty Papers. Additional substrate materials contemplated include crepe paper, printer paper, A4 paper, and other cellulosic materials. Additional examples of materials contemplated for the substrate 12 include plastics, polymers, fabrics, non-woven substrates, such as a PET non-woven substrate, and/or combinations thereof. Additionally, the substrate 12 may include combinations of manufactured, natural, and recycled or reclaimed materials. It is further contemplated that the substrate 12 may include a laminate composed of two or more layers of materials, wherein the laminate may include only volatile active-permeable materials or combinations of volatile active-permeable and impermeable materials.

In one embodiment, the substrate 12 has a flat, smooth appearance. In another embodiment, however, the substrate 12 may have various textures and/or surface patterns, such as a rough surface, a smooth surface, a channeled surface, and combinations thereof that may increase surface area and/or the rate of emanation of the composition. The substrate 12 may be of any size or shape. For example, the substrate 12 may have a rectangular configuration and dimensions of about 2.5 cm to about 25 centimeters, or about 5 centimeters to about 12 centimeters, or about 7.5 centimeters to about 13 centimeters, and the like. Additional shapes contemplated include circles, hearts, diamonds, squares, triangles, or any other geometric shape.

Further criteria that may be relevant for choosing a substrate 12 include the thickness or caliper of the substrate. For example, the substrate 12 may have a thickness (±10%) of about 0.15 mm, or about 0.3 mm, or about 0.4 mm, or about 0.5 mm, or about 1 mm, or about 2 mm, or about 3 mm, or about 5 mm, or about 10 mm. In addition, the basis weight of cellulosic materials may of interest when choosing such substrates. For example, a basis weight (±10%) of about 250 gsm, or about 300 gsm, or about 330 gsm may be desirable. Further, the rapidity of a cellulosic substrate may be considered. For example, a rapidity (±10%) of about 50 ml/minute, or about 60 ml/minute, or about 70 ml/minute, or about 100 ml/minute may be desirable. Another factor to be considered for cellulosic substrates includes wet burst strength. For example, a desirable substrate may have a wet burst (±10%) of about 180 centimeters $H_2O$, or about 215 centimeters $H_2O$, or about 250 centimeters $H_2O$, or about 280 centimeters $H_2O$.

Rigidity or stiffness of a substrate may be a further criterion for consideration in choosing a substrate. Appropriate rigidity may aid in the appearance and stability of the substrate by reducing the amount of curl of the substrate when impregnated with a composition and/or when exposed to humid conditions. One measure of stiffness is Taber Stiffness or the bending moment (represented in g-cm or mN*m). For cellulosic substrates, these measurements may be taken along the machine direction (MD) and cross machine direction (CD) orientations of the cellulosic fibers of the substrate. For example, minimal bending moments for a desirable substrate may have a range (±10%) of about 5 to about 10, or about 10 to about 25, or about 20 to about 100, or about 50 to about 175, or about 100 to about 225, or about 150 to about 275, or about 200 to about 325 g-cm or greater as measure by a Taber-type tester in a basic configuration (standard TAPPI T 489 om-13) or a Taber-type tester in 0 to 10 configuration (standard TAPPI T 566 om-08), where the tester was verified with standard control paper.

Moreover, another measure is the resistance to bending (represented in mN) of a substrate. Such a measure is relevant in the present context where a dispenser 10 may be employed in different states according to whether the dispenser is in a two dimensional state or a three dimensional state after being manipulated by the user. For example, a substrate may require a minimal average force to overcome the substrate's inherent resistance to bending. In one embodiment, a substrate may require (±10%) at least about 30 mN, or about 60 mN, or about 100 mN, or about 200 mN, or about 300 mN, or about 400 mN, or about 500 mN, or about 200 to about 400 mN, or about 300 to about 500 mN, or about 400 to about 600 mN of force to overcome its resistance to bending.

For example, a comparison of substrate stiffness and resistance to bending for a pair of different substrate materials (EMI 18430 and A4 (80 gsm)) is shown in Table No. 1 taken according to the above testing methodologies.

TABLE NO. 1

Taber Stiffness of Substrates.

| Sample Identificaton | 18430 | | A4 | |
|---|---|---|---|---|
| Orientation | MD | CD | MD | CD |
| Taber Stiffness or Bendng Moment (Taber Stiffness Units (g-cm)) | | | | |
| Average | 290 | 163 | 2.10 | 0.978 |
| Std. Dev. | 11.8 | 10.4 | 0.053 | 0.0773 |
| Max | 306 | 171 | 2.17 | 1.06 |
| Min | 275 | 151 | 2.03 | 0.885 |
| n= | 5 | 3 | 5 | 5 |
| Loading Weight (Taber Units) | 2000 | 2000 | none | none |
| Taber Stiffness or Bending Moment (mN*m) | | | | |
| Average | 28.5 | 16.0 | 0.206 | 0.0959 |
| Std. Dev. | 1.16 | 1.02 | 0.0052 | 0.00758 |
| Max | 30.0 | 16.8 | 0.213 | 0.104 |
| Min | 27.0 | 14.8 | 0.199 | 0.0868 |
| n= | 5 | 3 | 5 | 5 |
| Resistance to Bending (mN) | | | | |
| Average | 569 | 319 | 20.6 | 9.59 |
| Std. Dev. | 23.2 | 20.4 | 0.52 | 0.758 |
| Max | 600 | 335 | 21.3 | 10.4 |

TABLE NO. 1-continued

| Taber Stiffness of Substrates. | | | | |
|---|---|---|---|---|
| Sample Identificaton | 18430 | | A4 | |
| Orientation | MD | CD | MD | CD |
| Min | 539 | 296 | 19.9 | 8.68 |
| n= | 5 | 3 | 5 | 5 |

Another factor that may be considered in choosing the substrate 12 is the rate of release of a composition impregnated within the substrate. For example, a substrate 12 may be chosen to provide a release rate such that an effective amount of a volatile material, such as an insect control active, which may be an insecticide or insect repellent, is released for a specific length of time, such as for about 1, or about 2, or about 4, or about 7, or about 14 days. In one embodiment, the insect control active may be a mosquito control active, such as an insecticide or repellent effective against mosquitoes. Further, the substrate 12 may also be chosen based on its ability to maximally release a composition held therein, such that at the end of life of the dispenser 10, a minimal amount of composition is still contained therein. An example of the amount of composition released over time is shown below in Table No. 2, which illustrates the remaining insecticide (TFT=transfluthrin) in milligrams at different time points (days) over a period of 14 days. Each substrate began with 80 mg TFT.

TABLE NO. 2

| Amount of Composition Release Over Time Per Substrate. | | | | | |
|---|---|---|---|---|---|
| Treatment | 0 | 4 | 7 | 9 | 14 |
| Crepe Paper | 72.3 | 51.4 | 40.7 | 30.9 | 17.5 |
| EMI 18430 | | 48.1 | 33.7 | | |
| EMI 30250 | 78.4 | | 62.5 | 49.1 | 23.2 |

Table No. 3 illustrates the average release rates (mg/hr) of the three substrates shown in Table No. 2 based on the amount released by day 7.

TABLE NO. 3

| Comparison of Release Rates Per Substrate. | |
|---|---|
| Treatment | Approximate average release rate at 7 days (mg/hr) |
| Crepe Paper | 0.2 |
| EMI 18430 | 0.3 |
| EMI 30250 | 0.1 |

Based on the data in Table Nos. 2 and 3, EMI 18430 may be chosen as a more effective substrate due to the higher rate of release, which translates into a reduced amount of composition left in the card and greater efficiency. Contemplated effective release rates of the insect control active in a substrate may be about 0.05 mg/hr, or about 0.1 mg/hr, or about 0.2 mg/hr, or about 0.3 mg/hr, or about 0.5 mg/hr, or about 1 or about 2 mg/hr, or about 5 or about 10 mg/hr, or from about 0.05 to about 0.2 mg/hr, or from about 0.1 to about 0.3 mg/hr, or from about 0.2 to about 0.5 mg/hr, or from about 0.5 to about 2 mg/hr, or from about 2 to about 5 mg/hr, or from about 5 to about 10 mg/hr.

By dosing or coating the substrate 12 with an appropriate composition, air encountering the dispenser 10 will acquire a portion of the volatile material 14 thereon and/or therein and dispense it from the dispenser. Suitable volatile materials/actives may include, for example, insect repellents or insecticides. Alternatively, any other volatile material known to those skilled in the art may be used.

In one embodiment, the insect control active may include D-teflumethrin, transfluthrin, prallethrin, vaporthrin, metofluthrin, tefluthrin, esbiothrin, other synthetic pyrethroids, and combinations thereof. In another embodiment, the insect control active may include insect repellents, such as, for example, mosquito repellents. The composition may solely include an insect control active, or may further include an oil-based and/or water-based carrier, a hydrocarbon, an alcohol, for example, ethanol, or other solvent or carrier, and combinations thereof. It is contemplated fragrances may be used as "use up" indicators, such that when a user can no longer perceive the scent of the fragrance, the strength of the insect control active is no longer effective for its intended purpose and a new device is required or the device must be "recharged" with another dose of the composition or replaced. In this embodiment, the emanation rate of the fragrance and that of any volatile active are substantially the same. Additional use-up cues may include individual or combinations of appearing and disappearing inks and the like. Any fragrance may be used herein including, for example, a floral scent, a fresh scent, a lavender scent, a eucalyptus scent, a pine scent, a spice scent, and combinations thereof.

In one embodiment, a composition may include a fragrance, a carrier, and volatile active/active ingredient in an amount as depicted in Table No. 4.

TABLE NO. 4

| Composition. | |
|---|---|
| Component | Approximate Wt % (±10%) |
| Fragrance | 80% |
| Carrier | 12 to 17% |
| Volatile active | 3 to 8% |

In another embodiment, exemplary compositions contemplated herein include Compositions A to C as depicted in Table Nos. 5 to 7.

TABLE NO. 5

| Composition A. | | |
|---|---|---|
| Component | Mg | Approximate Wt % (±10%) |
| Fragrance | 1600 | 80% |
| Ethanol | 339.46 | 16.973% |
| Transfluthrin (99.1%) | 60.54 | 3.027% |

TABLE NO. 6

| Composition B. | | |
|---|---|---|
| Component | Mg | Approximate Wt % (±10%) |
| Fragrance | 800 | 80% |
| Ethanol | 119.27 | 11.927% |
| Transfluthrin (99.1%) | 80.73 | 8.073% |

TABLE NO. 7

| Composition C. | | |
|---|---|---|
| Component | Mg | Approximate Wt % (±10%) |
| Fragrance | 1600 | 80% |
| Ethanol | 319.28 | 15.964% |
| Transfluthrin (99.1%) | 80.72 | 4.036% |

In one embodiment, Compositions A, B, or C, once mixed, may be applied to a substrate measuring about 7.5 centimeters by about 12.5 centimeters in an amount of about 2 grams total to provide a functional dispenser 10.

In another embodiment, the components of a composition, once combined, may be thoroughly mixed and dosed onto the substrate 12 in any desired amount. For example, the compositions may be dosed in an amount of about 1 gram, or about 2 grams, or about 4 grams, or about 8 grams, or about 10 grams, or about 20 grams, or about 50 grams per cellulose substrate measuring about 7.5 by about 12.5 centimeters and having a caliper width of about 15 mm.

The substrate 12 is preferably capable of holding a dose of the composition containing the volatile active in a relatively even distribution thereon and also capable of allowing evaporation in response to the air flow equally from all exposed surfaces. The substrate 12 may also allow for wicking of the active ingredient following dosing to ensure efficient distribution throughout the substrate 12. Dosing may be accomplished by dropping, spraying, printing, or other conventional delivery of a liquid composition to the substrate 12.

The dispenser 10 may be employed in a first state, as shown in FIGS. 1 to 5 where the first wall portion 16 and the second wall portion 18 of the substrate 12 are substantially planar. One or more attachment points 24 may be used to maintain the dispenser 10 in the first state until a user disrupts the attachment point(s) to allow the dispenser to be employed in a second state, as depicted in FIGS. 6 to 11. The attachment point(s) 24 may be formed during the manufacture of the dispenser 10 by cutting slits 26 and 28 in the substrate 12 by means known in the art, such as die cutting, to form the second wall portion 18, wherein the slit 28 does not extend completely to the bottom edge 30 of the substrate. Alternatively, or in addition, the attachment point(s) 24 may be formed of an adhesive, staple, or any other chemical or mechanical based attachment means known to one of skill in the art. Further, the attachment point(s) 24 may additionally, or alternatively, comprise a conventional perforated portion(s) or tear strip as known to one of skill in the art.

Figures 3, 4, 5, 6:
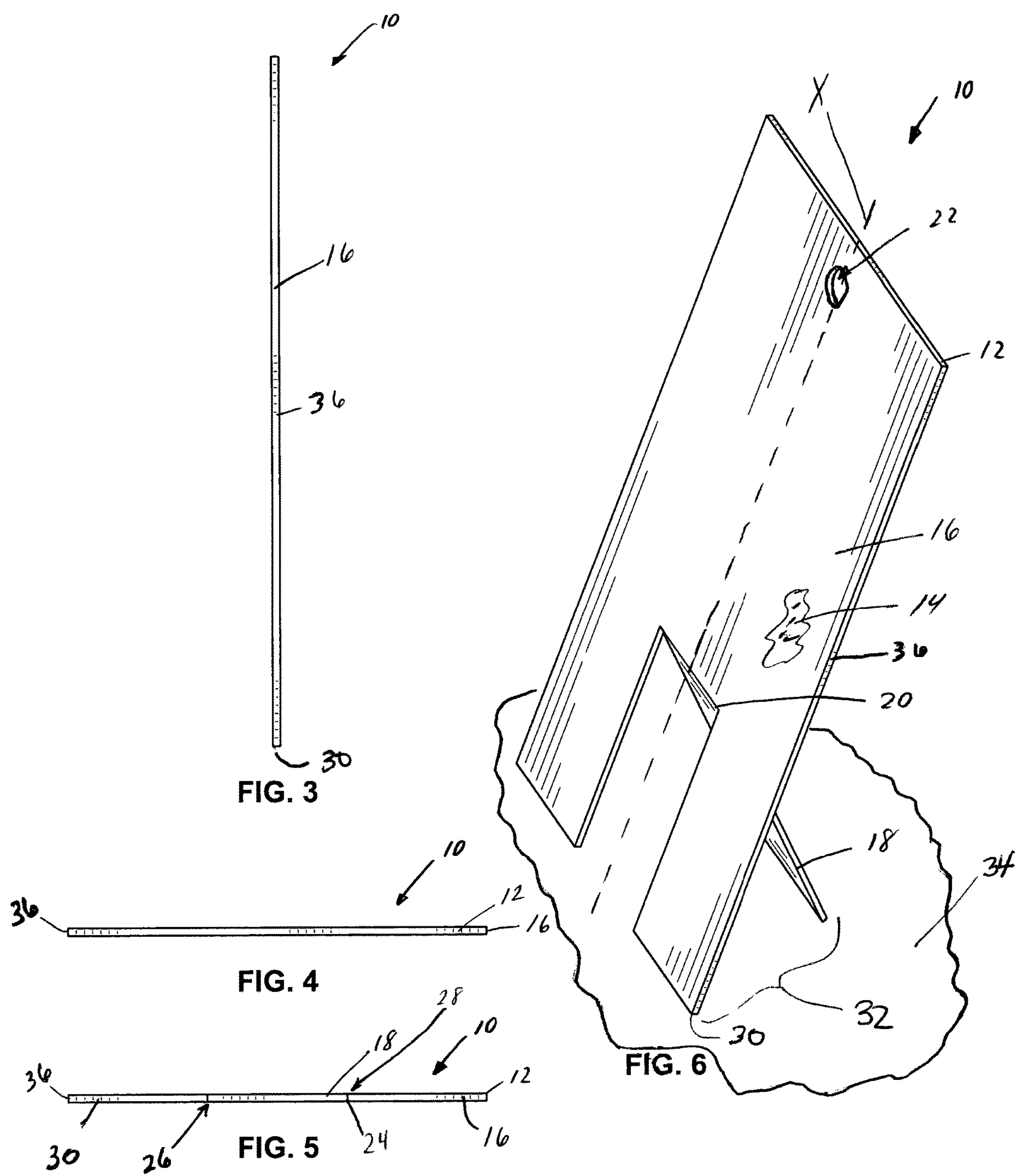
FIG. 3 is a right side elevational view of the dispenser of FIG. 1, the left side elevational view being a mirror image thereof.
FIG. 4 is a top plan view of the dispenser of FIG. 1.
FIG. 5 is a bottom plan view of the dispenser of FIG. 1.
FIG. 6 is a front isometric view of the dispenser of FIG. 1 in a second state.
Figures 7, 8:
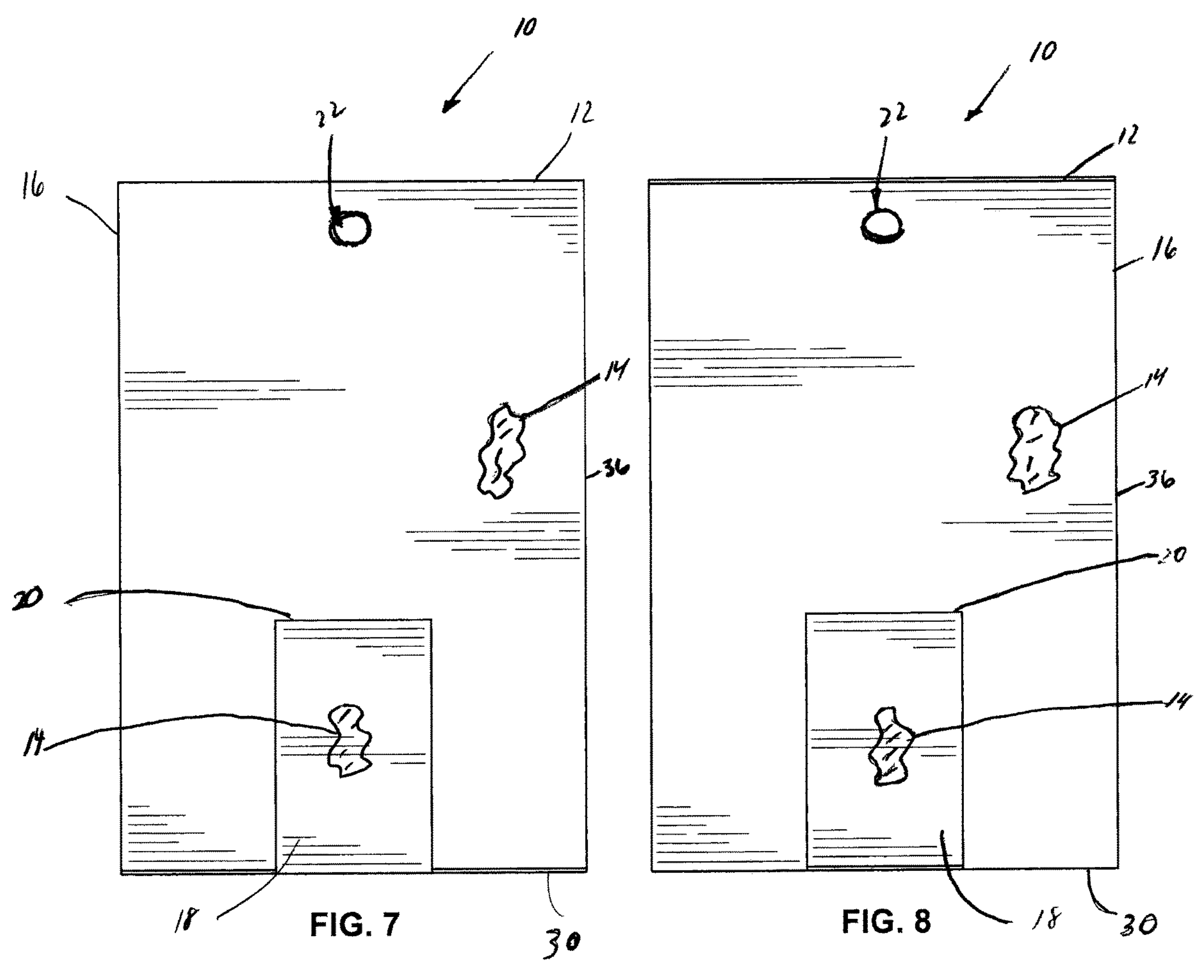
FIG. 7 is a front elevational view of the dispenser of FIG. 6.
FIG. 8 is a rear elevational view of the dispenser of FIG. 6.
Figure 9:
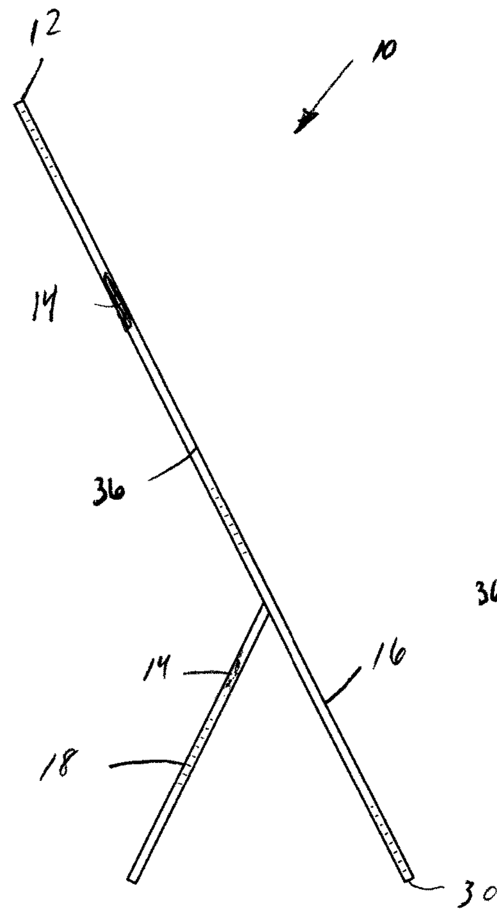
FIG. 9 is a left side elevational view of the dispenser of FIG. 6, the right side elevational view being a mirror image thereof.
Figure 10:
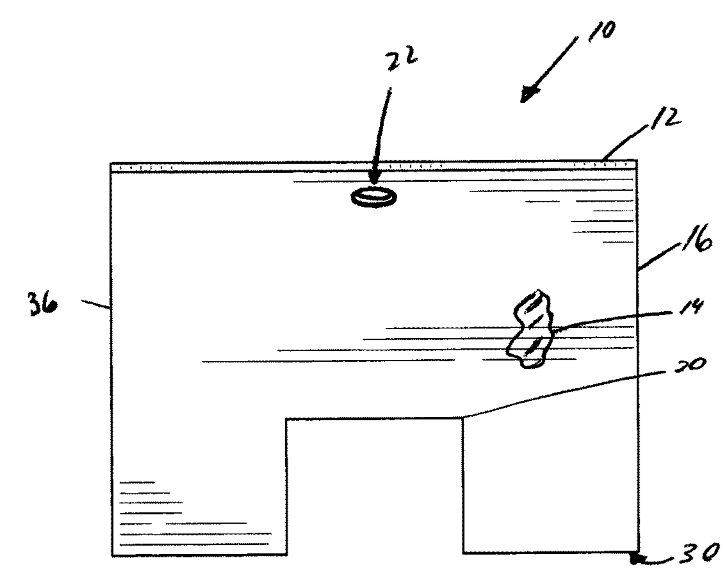
FIG. 10 is a top plan view of the dispenser of FIG. 6.

To convert the dispenser 10 from the first state to the second state, a user may disrupt the attachment point(s) 24 by breaking the bond or otherwise removing the impediment to allow the second wall portion 18 to rotate away from the first wall portion 16 about the fold line 20. In the second state, the dispenser 10 has a substantially triangular configuration such as seen in FIG. 6. In the second state, the first 16 and second 18 wall portions form a relatively rigid base 32 that may rest on a surface 34, thereby effectively suspending the dispenser 10 above the surface 34. In other words, the substantially triangular structure 32 is adapted to enable the dispenser 10 to have a substantially vertical orientation when placed on a horizontal surface 34. Thus, the dispenser 10 may be effectively deployed in either the first state when hung from a support (not shown) or the second state when placed on the horizontal surface 34.

In one embodiment, the dispensers 10 of the present disclosure may be sold in a package in a first state where the first 16 and second 18 wall portions are substantially planar. Further, the packaging may be made of any material that preserves the volatile material 14 within the substrate 12 during shipping and storage, such as a cellulosic material, a plastic material, and combinations thereof. Moreover, the packaging may be of any useful and/or aesthetic shape or configuration known to one skilled in the art, such as a pouch, a bag, a box, a laminated structure, and the like.

In one embodiment, a user may initiate use of a dispenser 10, for example, a mosquito repellent card, by opening a pouch containing one or more dispensers and removing the dispenser from the packaging. Thereafter, the dispenser may be retained in a first state or converted from the first state to a second state to place the dispenser on a flat surface. Alternatively, a string or similar item may be inserted through the aperture 22 to hang the mosquito repellent card in a room. In some embodiments, the string or similar item is already provided in an attached manner to the dispenser upon removal of the dispenser from the package. Upon deployment in a room, a dispenser may require a period of time to reach full strength. For example, it may require about ¼ day, or about ½ day, or about 1 day, or about 2 days to reach full strength.

Dispensers of the present disclosure may be used in an interior space or an exterior space. For example, a dispenser 10 may be effective against mosquitoes in a room having a size of about 3× about 3 meters, or about 4× about 4 meters, or about 5× about 5 meters, or more or less. Further, dispensers of the present disclosure may have an effective duration of continuous use of about 1 day, or about 2 days, or about 4 days, or about 7 days, or about 2 weeks, or about 1 month, or about 2 months, or more or less.

In addition, while not wishing to be bound by theory, it is believed that the volatile material 14 within the dispenser 10 may have a first emanation rate in the first state and a second emanation rate in the second state. For example, the dispenser 10 while in the first state, if placed on the horizontal surface 34, would only have the side opposite the surface 34 exposed to the ambient environment and therefore a minimal amount of surface area from which the composition may emanate. In contrast, in the second state, the dispenser 10 may have a substantially vertical orientation relative to the surface that exposes a greater surface area of the substrate 12 to the ambient environment. Therefore, in the second state, a greater amount of composition may be released over time from the dispenser 10. In addition, it is believed that when deployed in the second state, the articulation of the second wall portion 18 from the first wall portion 16 enables greater air flow through the substrate 12 to increase the emanation rate relative to the dispenser 10 when in the first state.

The dispenser of FIGS. 1 to 11A has a substantially rectangular shape and may be sized to have a length L1 of about 12.5 centimeters and a width W1 of about 7.5 centimeters (see FIG. 1). The second wall portion 18 may have a width W2 of about 2.5 centimeters, which may result in the first wall portion 16 having widths W3 and W4 on either side of the second wall portion of about 2.5 centimeters each. However, the placement of slits 26 and 28 may be varied, which allows for varying widths W2 to W4. Further, the placement of the second wall portion 18 relative to a center point C of the substrate 12 may also be varied. Further, the slits 24, 26 may be of any length required to form a second wall portion 18 of sufficient length to form a stable base 32 when the dispenser 10 is deployed in the second state. For example, the slits may be about 2.5 centimeters, or about 5 centimeters, or about 7.5 centimeters or shorter or longer and any length therebetween. In the embodiment depicted in FIGS. 1 to 11A, the aperture 22, center point C, and the second wall portion 18, are centered along a central axis X (see FIGS. 1 and 6) that is parallel to a side edge 36 of the substrate 12.

Figure 11:
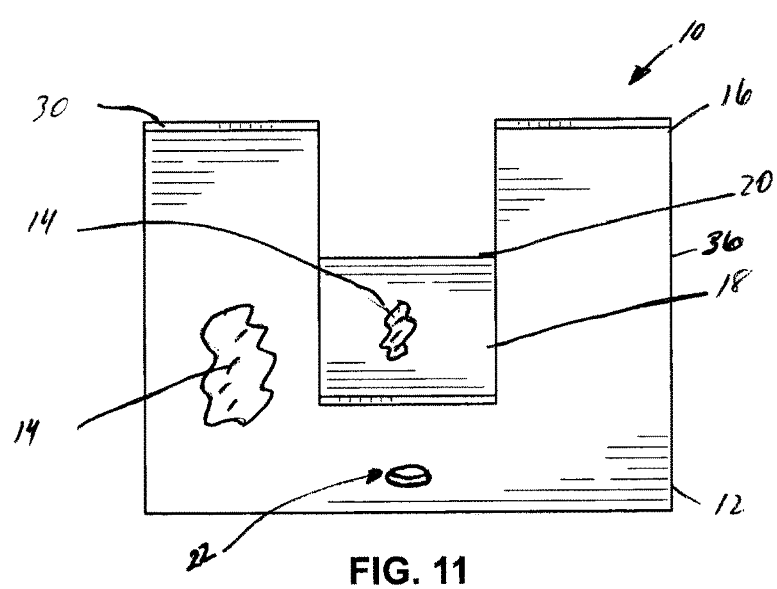
FIG. 11 is a bottom plan view of the dispenser of FIG. 6.
Figure 11A:
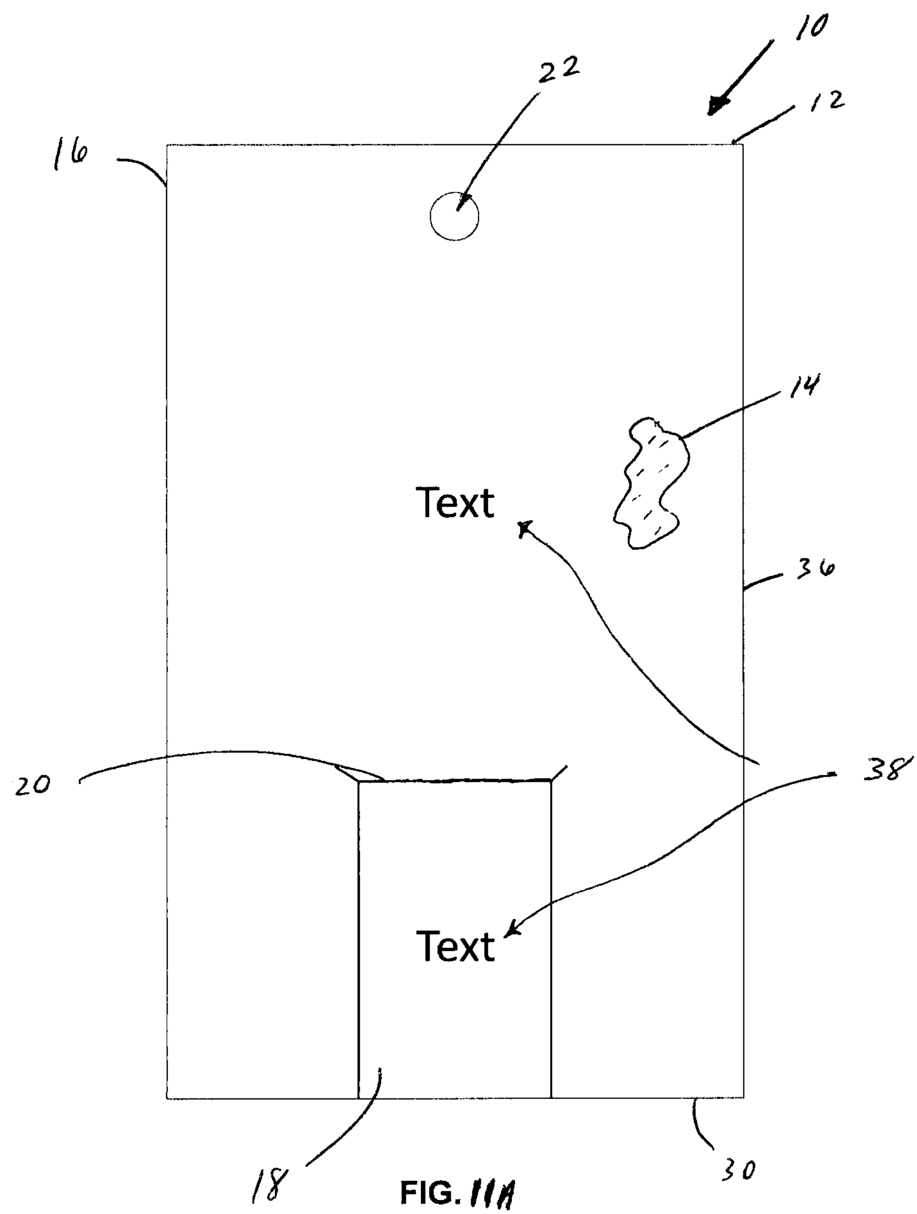
FIG. 11A is a front elevational view according to another embodiment of the dispenser of FIG. 1.
Figure 12:
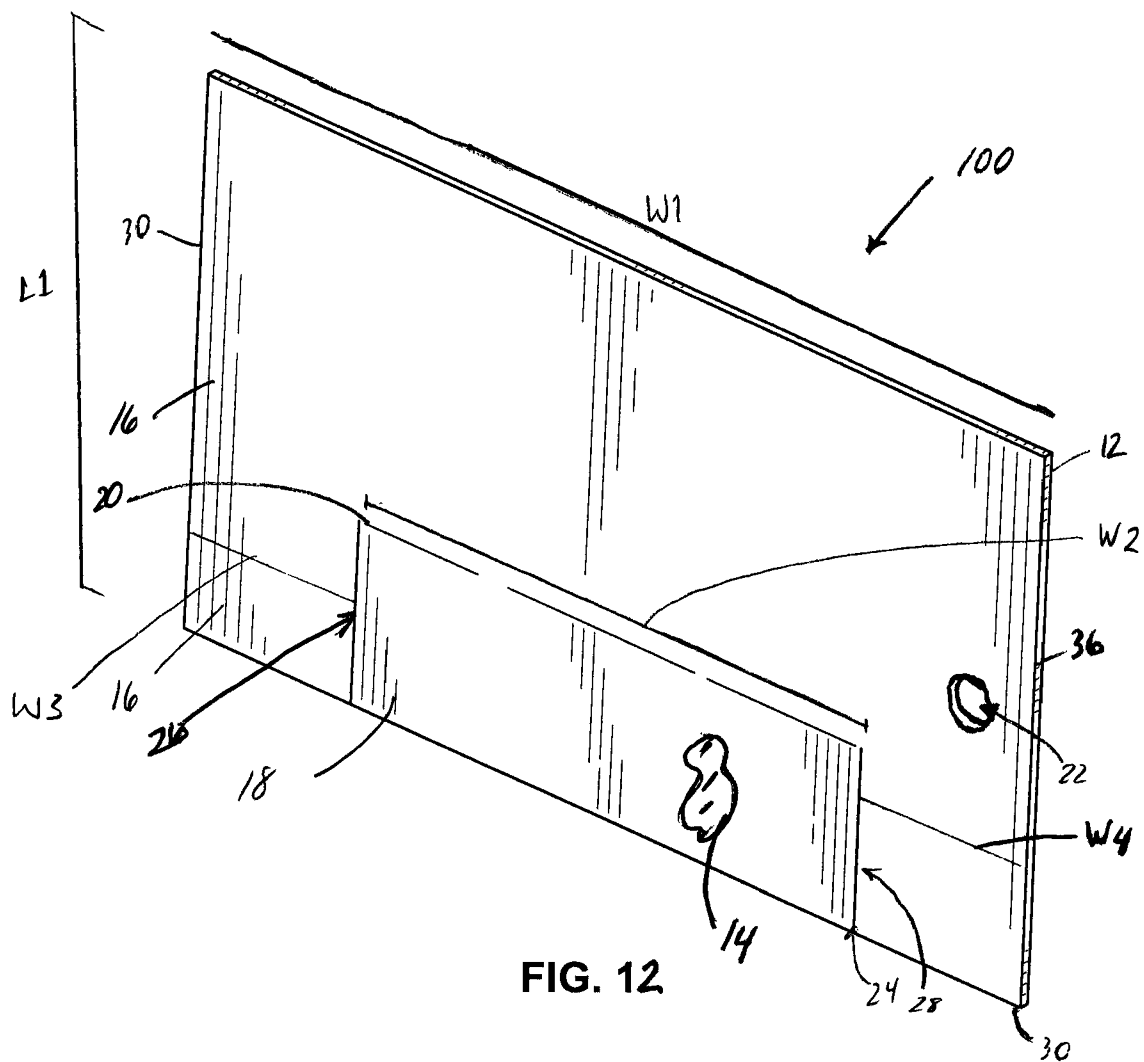
FIG. 12 is a front isometric view of a second embodiment of a dispenser in a first state.
Figure 13:
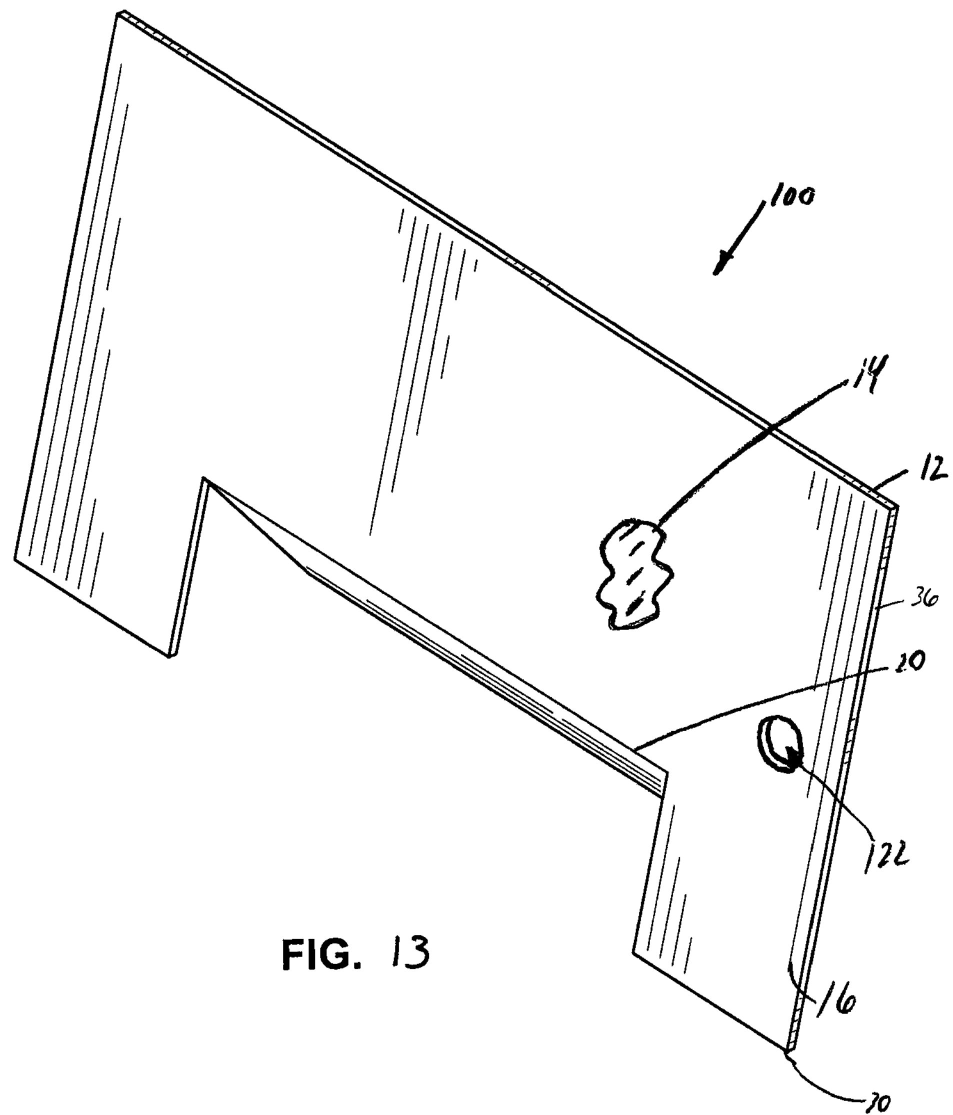
FIG. 13 is a front isometric view of the dispenser of FIG. 12 in a second state.
Figure 14:
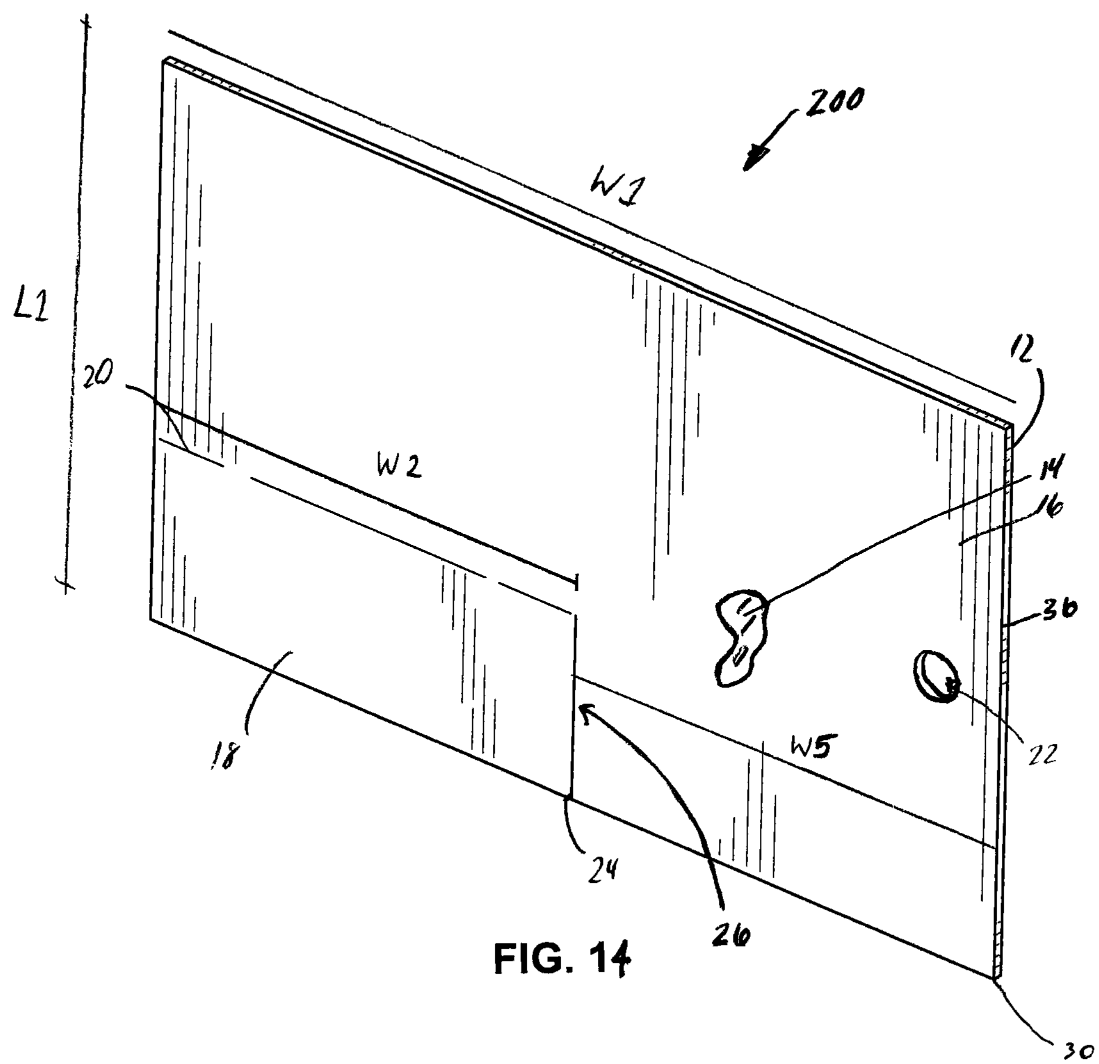
FIG. 14 is a front isometric view of a third embodiment of a dispenser in a first state.

With reference to FIG. 11A, the dispenser 10 may further include text 38 on either or both of the first 16 or second 18 wall portions and also on the front and/or back sides of the dispenser. In one example, the text 38 may include one or more of an instruction, a label, a description of the dispenser's materials, contents, and/or fragrance, a calendar that allows a user to record a day and/or date of initial use and record the number of days of use, an advertisement, an indication of the dispenser's effective lifespan, an indicium, an icon, a picture, a logo, a description of the insects that are effectively repelled and/or killed by the dispenser, a disease claim that indicates the type of disease-carrying insects the dispenser repels and/or kills, a country indicator that indicates in which countries the dispenser may be maximally effective, a brand name, a product name, a product descriptor, a caution, an avatar, and combinations thereof.

In one embodiment, the text 38 may include instructions that direct a user to open a container (not shown) in which the dispenser 10 is carried, such as a pouch, box, can, or other package, remove the dispenser from the container to activate the dispenser, identify a space to place the activated dispenser, and place the activated dispenser substantially in the center of the identified space, such as an indoor area, a room, a hall, a closet, a porch, and the like. The text 38 may further include instructions that direct a user to record an initial date of use of the passive volatile dispenser on the dispenser, such as on a calendar disposed thereon, allow a period of time to elapse for the dispenser to reach full strength, such as about 2 hours, or about 4 hours, or about 6 hours, or about 8 hours, and leave the dispenser in the space for a period of time, such as for about 3 days, or about 6 days, or up to about 7 days from the initial date of use. Further, instructions may direct a user to replace the dispenser 10 with a new dispenser after the dispenser's effective lifespan has passed. Moreover, the instructions may direct the user to use the dispenser in a room with a fan or in an area with air flow.

FIGS. 12 to 15 depict different embodiments of dispensers 100 and 200 that are similar to the dispenser 10 of FIGS. 1 to 11A. However, while the dispenser 10 had an L1 that was greater than W1, for the dispensers 100 and 200, W1 is greater than L1. For example, in one embodiment, while the dispenser 10 may have an L1 of about 12.5 centimeters and a W1 of about 7.5 centimeters, the dispensers 100 and 200 may have an L1 of about 7.5 centimeters and a W1 of about 12.5 centimeters. Further, the aperture 22 may be disposed near the side edge 36 rather than centered above the second wall portion 18. The widths W2 to W4 also differ in dispensers 100 and 200 from that of dispenser 10. For example, the dispenser 100 includes a width W2, which is the distance between slits 26 and 28, that is about 7.5 centimeters, and widths W3 and W4 of about 2.5 centimeters each.

Figure 15:
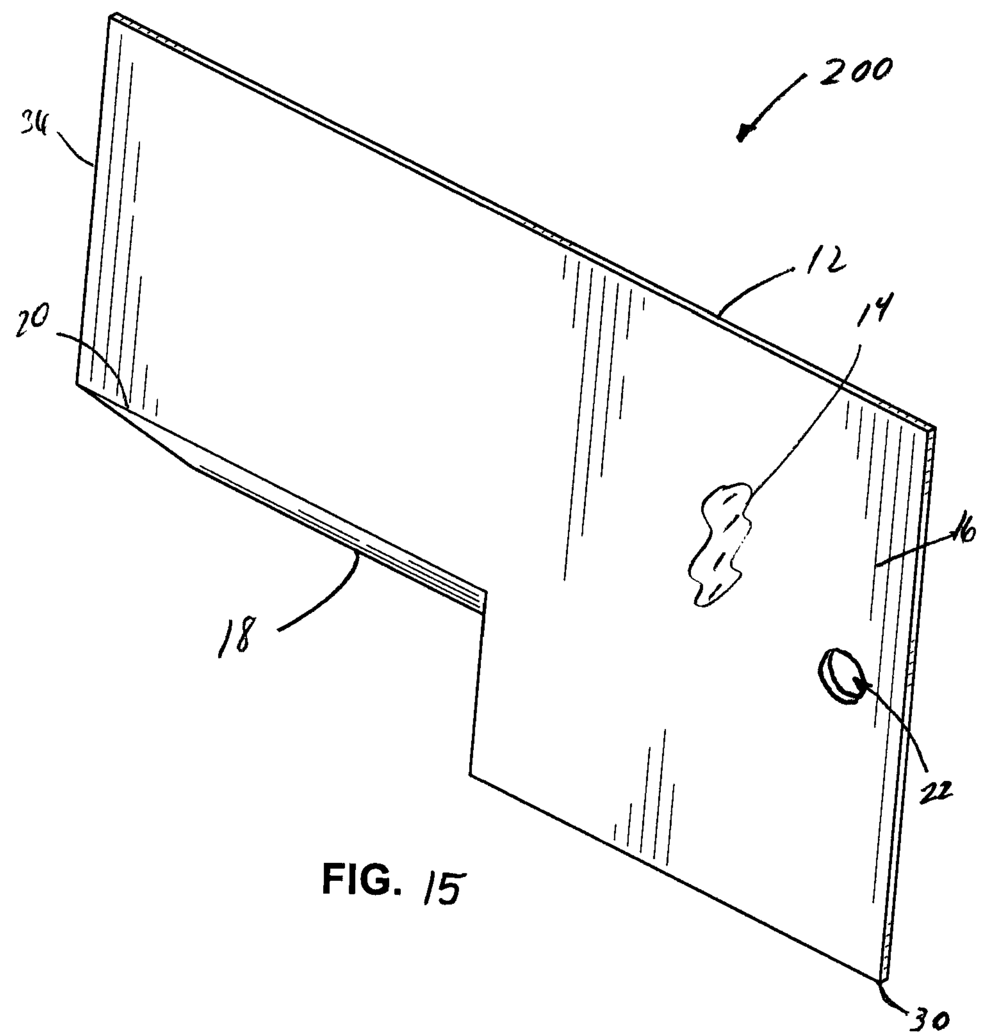
FIG. 15 is a front isometric view of the dispenser of FIG. 14 in a second state.

Dispenser 200 differs from dispenser 100 in that the second wall portion 18 is formed at a corner of the substrate 12 by a single slit 26 in the substrate. Further, the slit 26 is centered in the substrate 12, thereby providing a second wall portion with a width W2 of ½ W1. For example, when W1 is about 12.5 centimeters, W2 is about 6.3 centimeters. Further, the dispenser 200 of the present embodiment includes a width W5 of about 6.3 centimeters. Alternatively, the placement of the slit 26 may be modified in conjunction with the widths W2 and W5 to be off-centered. As shown in FIG. 15, when the dispenser 200 is deployed in the second state and in a substantially vertical orientation, it may have two different orientations: a first where the bottom edge 30 is placed on a horizontal planar surface or a second where the bottom edge is perpendicular to the surface.

Figure 16:
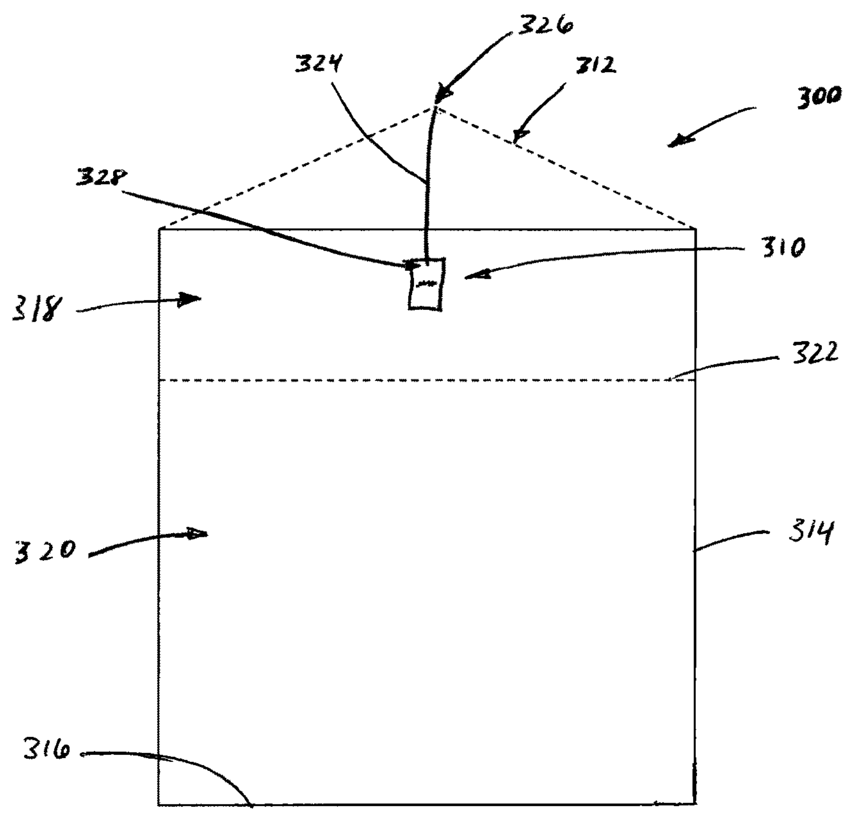
FIG. 16 is a front elevational, schematic view of a space in which a dispenser may be used according to one embodiment.
Figure 17:
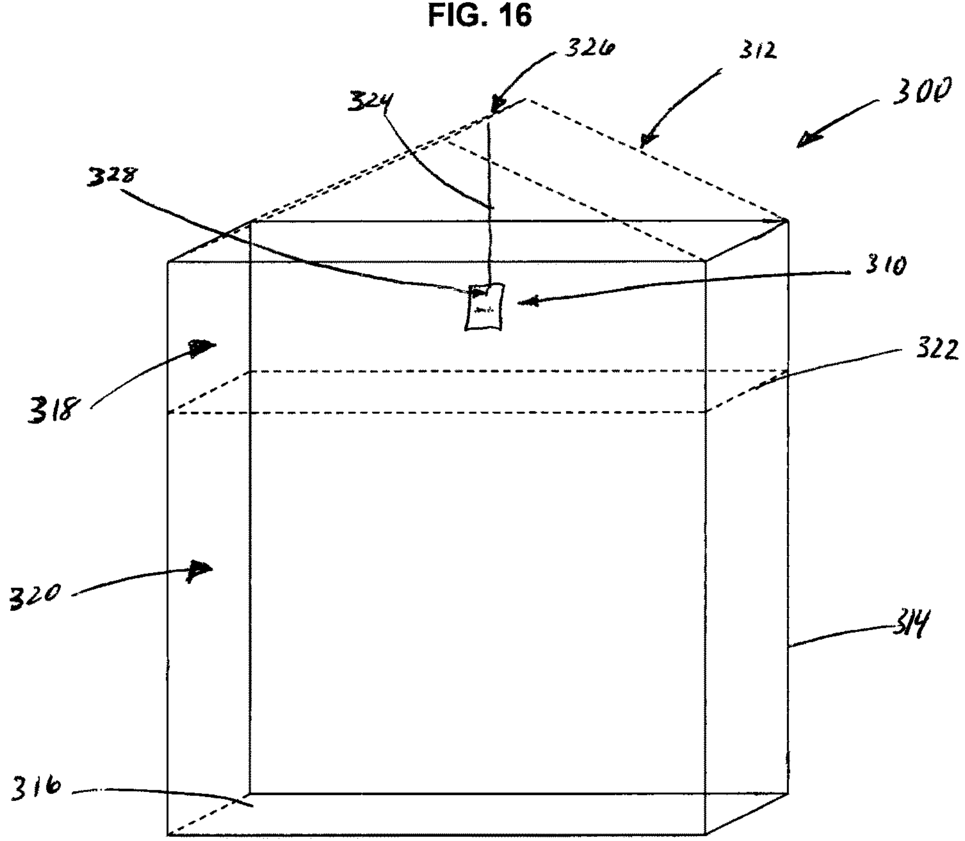
FIG. 17 is an isometric view of the space of FIG. 16.

FIGS. 16 and 17 illustrate a confined or interior space 300 such as an indoor area, a room, a tent, a hall, a closet, a porch, and the like, in which a user may place an activated dispenser 310 to repel or kill insects, such as mosquitoes. The space 300 may be bounded, at least partially, by a horizontally disposed top barrier 312, such as a ceiling, rafters, or a roof, a vertically disposed perimeter barrier 314, such as a wall, screen, window, curtain, and the like, and a horizontally disposed bottom barrier 316, such as a floor. Each of the top barrier 312, perimeter barrier 314, and bottom barrier 316 is typically at least partially impervious to air currents.

In one embodiment, the bottom barrier 316 of the space 300 has dimensions of about 3 meters by about 3 meters, or about 4 meters by about 4 meters, or about 5 meters by about 5 meters, or about 1 to 10 meters by about 1 to 10 meters. In another embodiment, the bottom barrier 316 has a surface area of about 9 meters$^2$, or about 10 to 12 meters$^2$, or about 12 to 16 meters$^2$, or about 16 to 20 meters$^2$, or about 24 to 48 meters$^2$. In the present embodiment, the bottom barrier 316 is substantially planar, however, it is contemplated that interruptions or other geometries may be applied to the bottom barrier as are typically found in such spaces.

The perimeter barrier 314 may have a height of about 2 meters, or about 3 meters, or about 4 meters, or about 5 meters, or about 2 to 10 meters, and the like. The perimeter barrier is presently depicted as a generally rectangular area comprising planar walls as may be conventionally found in such spaces. However, it is also contemplated that the perimeter barrier may be provided with interruptions, e.g., a window, door, open wall, etc., or other geometries, e.g., a shelf, a ledge, rounded walls, other wall geometries that extend inwardly or outwardly about a length or height thereof, etc.

The top barrier 312 may have similar dimensions to that of the bottom barrier 316. For example, the interior space 300 may be a conventional rectangular room with planar bottom and top walls, i.e., bottom and top barriers 316, 312, respectively, with generally perpendicular walls extending therebetween, i.e., the perimeter barrier 314. In a different embodiment, the top barrier 312 may be provided with a different geometry, e.g., as an angled ceiling such as shown in FIGS. 16 and 17, which demarcates the upper boundary of the interior space 300.

The space 300 may be divided into separate zones, including for example, an upper or first zone 318 and a lower or second zone 320. The upper zone 318 may extend vertically downward from the top barrier 312 to a first height 322. The first height 322 may be any distance from the bottom barrier 316. For example, the first height 322 may be about 1 meter, or about 2 meters, or about 3 meters, or about 4 meters, or about 5 meters from the bottom barrier 316. Further, the first height 322 may be determined by the average height of a given population at a particular age. For example, the first height 322 may be at or above about the average height of an adult in a country where the dispenser 310 is to be used. Further, the first height 322 may be determined with reference to the height of the top barrier 312. For example, the first height 322 may be any distance from the top barrier 312. Further, the first height 322 may be about ½ meter, or about 1 meter, or about 2 meters, or about 3 meters, or about 4 meters, or about 5 meters from the from the top barrier 312. The second zone 320 extends vertically downward from the first height 322 to the bottom barrier 316. Preferably, the second zone 320 is the area normally occupied by the user of the space 300, and the first zone 318 is the remaining area of the space above the area normally occupied by the user.

While each of the top barrier 312, perimeter barrier 314, and bottom barrier 316 is typically at least partially impervious to air currents, there may be differential air currents within the space 300 based on the zone. For example, the first zone 318 may have little to no air current but the second zone 320 may have slight to moderate air currents due to foot traffic, air flow through a window, a fan, an air vent, and the like. In one embodiment, the first zone 318 has an air flow of about 10%, or about 20%, or about 40% that of the second zone 320. In another embodiment, the second zone 320 has an air flow of about 1×, or about 2×, or about 3×, or about 10× of that of the first zone 318. In a further embodiment, the second zone 320 may have an air flow measured in cubic meters (or meters) per second of about 0.01, or about 0.03, or about 0.5, or about 1, or about 2, or about 4, or about 8, or about 10, or about 20, or about 40. Contemplated air flow rates may also range from about 0.01 to about 0.1, or about 0.03 to about 0.3, or about 0.05 to about 0.5, or about 0.1 to about 1 cubic meters (or meters) per second.

FIGS. 16 and 17 further illustrate an activated dispenser 310 suspended within the first zone 318 by a suspension device 324 that has been attached to an attachment point 326. The dispenser 310 may be any of the dispensers as shown in FIGS. 1 to 15 or otherwise contemplated herein. The suspension device 324 may include a string, a wire, a cord, a rope, a chain, a hook, or similar means attached at one end to the dispenser 310, such as at an aperture 328, and at the other end to the attachment point 326. The suspension device 324 may be of sufficient length to permit suspension from an attachment point 326 within the first zone 318, such that the dispenser 310 is suspended within the first zone. For example, the suspension device 324 may be about 30 centimeters, or about 40 centimeters, or about 60 centimeters, or about 1 meter in length. In one embodiment, the attachment point 326 is substantially in the center of the space 300, such that the dispenser 310 is suspended substantially in the center of the room or interior space 300 within the first zone 318. However, other embodiments are contemplated including suspension of the dispenser on a wall or placement on a horizontal surface (not shown), such as a table, shelf, and the like, within the interior space 300 with the suspension device 324 removed or otherwise not utilized.

INDUSTRIAL APPLICABILITY

The dispenser described herein advantageously combines the functional characteristics of an insect control active dispenser that is adjustable between first and second states to facilitate the use of the system.

Numerous modifications will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the application are reserved. All patents and publications are incorporated by reference.

We claim:

1. A method of providing a passive volatile material dispenser to consumers, comprising:

providing a sealed pouch containing a passive volatile material dispenser having instructions, the passive volatile material dispenser comprising a porous substrate impregnated with an insect control active, wherein the porous substrate has a TAPPI T 489 om-13 or TAPPI T 566 om-08 minimal bending moment of about 150 to about 275 g-cm, wherein the porous substrate comprises a first wall portion and a second wall portion hingedly connected along a first hinge, and separably connected, wherein the porous substrate comprises only the first hinge, wherein upon activation the dispenser exhibits an effective release rate of the insect control active of about 0.1 to about 0.3 mg/hr, and wherein the instructions direct a consumer to:

(i) open the pouch and remove the passive volatile material dispenser therefrom to activate the passive volatile material dispenser, and (ii) place the activated passive volatile material dispenser substantially in a center of a room.

2. The method of claim 1, wherein the instructions further direct the consumer to:

(iii) record an initial date of use of the passive volatile material dispenser on the passive volatile material dispenser, (iv) allow 6 hours for the passive volatile material dispenser to reach full strength, and (v) leave the passive volatile material dispenser in the room for up to about 7 days from the initial date of use.

3. The method of claim 2, wherein the instructions further direct the consumer to:

(vi) use the passive volatile material dispenser in a room with a fan or in an area with air flow.

4. The method of claim 1, wherein the porous substrate comprises a cellulosic material, a plastic, a polymer, a fabric, a non-woven substrate, and combinations thereof.

5. The method of claim 1, wherein the second wall portion is hingedly connected to the first wall portion at a first fold line, the first wall portion and the second wall portion forming a substantially planar structure in a first state.

6. The method of claim 1, wherein the first wall portion and second wall portion are adapted to form a substantially triangular structure in a second state.

7. The method of claim 6, wherein the dispenser is adapted to form the substantially triangular structure in the second state by application of a minimal average force of about 320 to about 570 mN to the second wall portion at an end opposite the first fold line in a direction substantially perpendicular to the substantially planar structure in the first state.

8. The method of claim 1 further comprising a suspension device for suspending the porous substrate in a substantially vertical orientation from an upper end of the porous substrate.

9. The method of claim 1, wherein the insect control active comprises a pyrethroid.

10. The method of claim 9, wherein the pyrethroid comprises transfluthrin or metofluthrin.

11. The method of claim 1 further comprising a carrier.

12. The method of claim 11, wherein the carrier comprises a fragrance.

13. The method of claim 11, wherein the carrier is released at a rate of about 1600 mg over a period of about 7 days.

14. The method of claim 1, wherein a bottom barrier of the room comprises a floor space of about 3 meters by about 3 meters, or about 4 meters by about 4 meters, or about 5 meters by about 5 meters, or about 1 to 10 meters by about 1 to 10 meters.

15. The method of claim 1, wherein a vertically disposed perimeter barrier of the room has a height of about 3 meters, or about 4 meters, or about 5 meters, or about 2 to 10 meters.

16. A method of directing and communicating product dispensing to consumers by providing a sealed pouch containing a passive volatile material dispenser having instructions, the passive volatile material dispenser comprising a porous substrate impregnated with an insect control active, the porous substrate comprising a first wall portion and a second wall portion hingedly connected along a first hinge, and separably connected, wherein the dispenser comprises only the first hinge, the method comprising directing a consumer to:

(i) open the pouch and remove the passive volatile material dispenser therefrom to activate the passive volatile material dispenser, and (ii) place the activated passive volatile material dispenser substantially in a center of a room.

17. The method of claim 16, the method further comprising directing the consumer to:

(iii) record an initial date of use of the passive volatile material dispenser on the passive volatile material dispenser, (iv) allow 6 hours for the passive volatile material dispenser to reach full strength, and (v) leave the passive volatile material dispenser in the room for up to about 7 days from the initial date of use.

18. The method of claim 17, wherein the instructions further direct the consumer to:

(vi) use the passive volatile material dispenser in a room with a fan or in an area with air flow.

* * * * *